May 25, 1937.   R. S. PERRY ET AL   2,081,639
METHOD OF AND APPARATUS FOR FACE MILLING
Filed Aug. 27, 1934   3 Sheets-Sheet 1
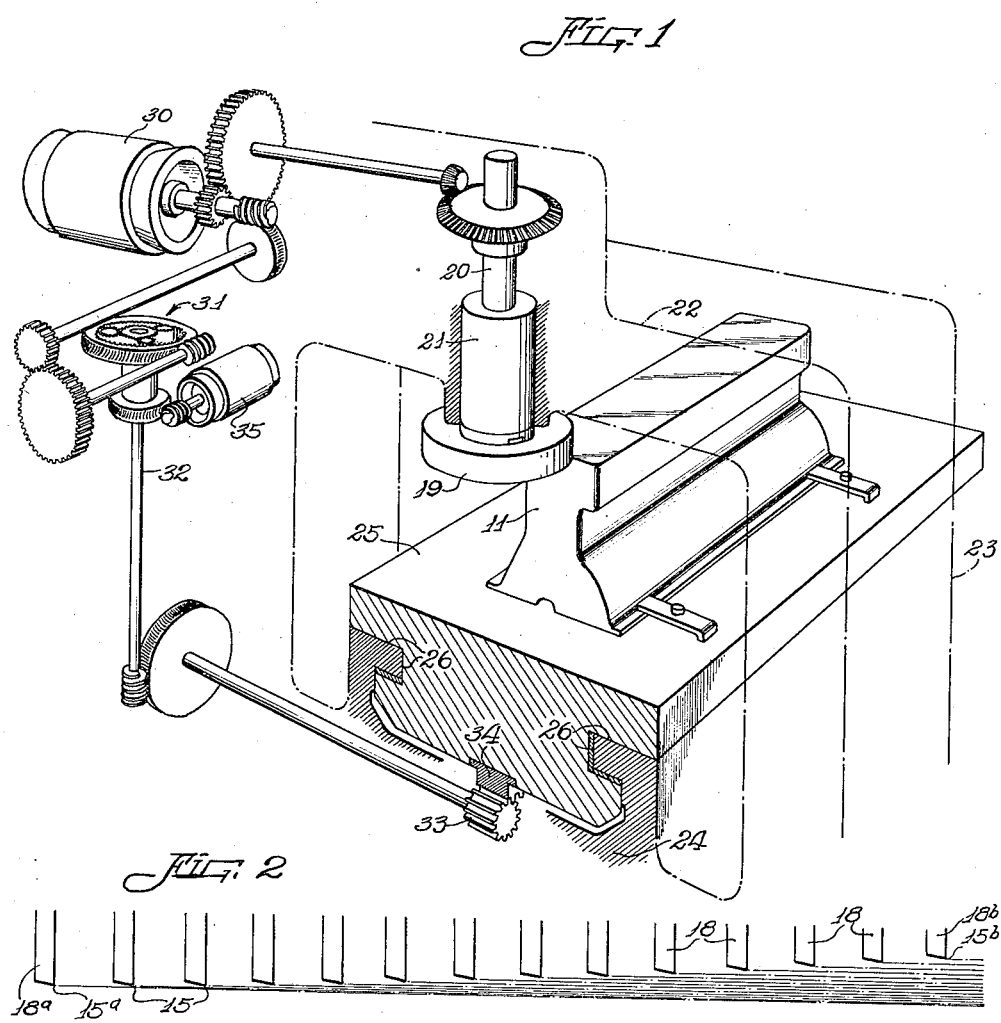
INVENTORS
Raymond S. Perry
Alexander Oberhoffken
By Chindall, Parker Carlson
ATTORNEYS

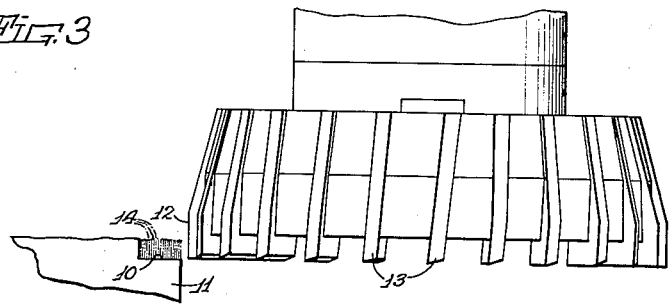
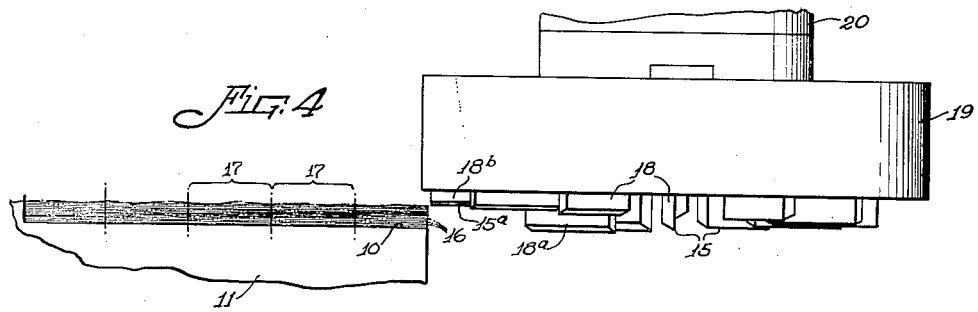
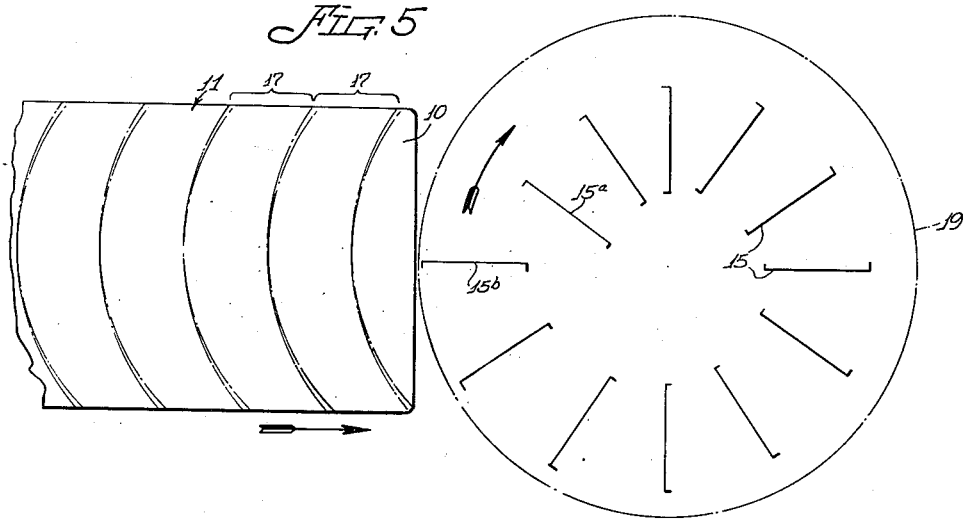

May 25, 1937.  R. S. PERRY ET AL  2,081,639
METHOD OF AND APPARATUS FOR FACE MILLING
Filed Aug. 27, 1934  3 Sheets-Sheet 3
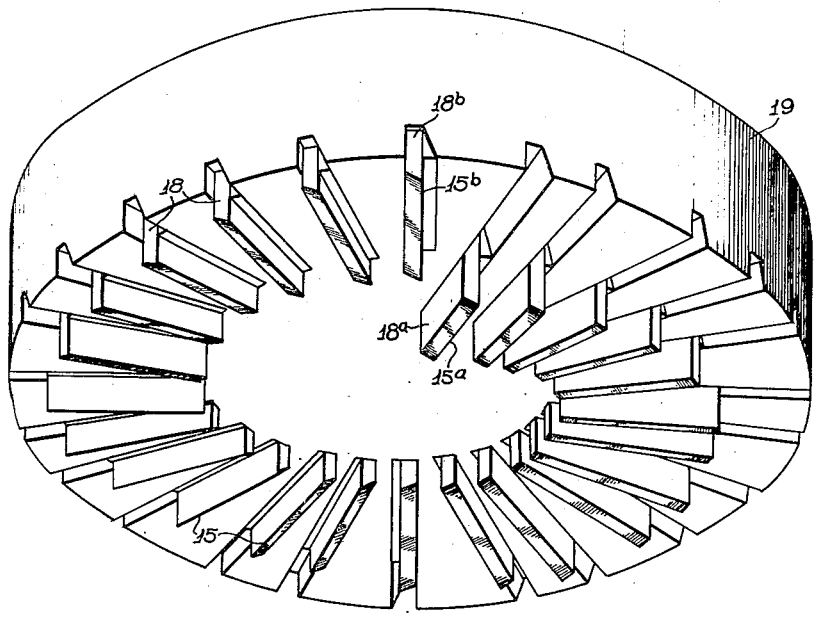
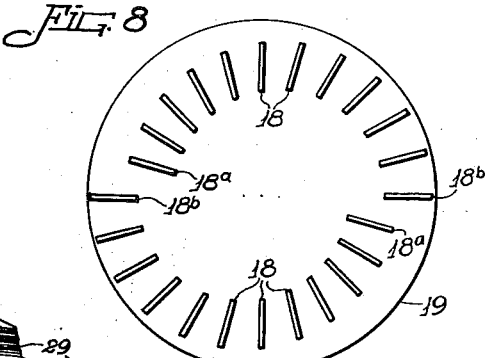
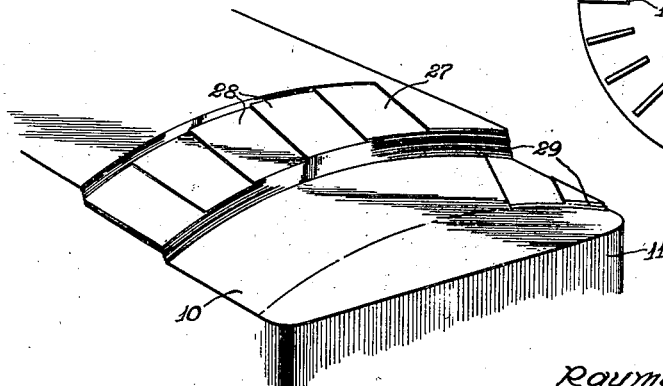
INVENTORS
Raymond S. Perry
Alexander Oberhoffken
By Lindell, Parker & Carlson
ATTORNEYS Patented May 25, 1937

2,081,639

UNITED STATES PATENT OFFICE 2,081,639

METHOD OF AND APPARATUS FOR FACE MILLING

Raymond S. Perry and Alexander Oberhoffken, Rockford, Ill., assignors to The Ingersoll Milling Machine Company, Rockford, Ill., a corporation of Illinois Application August 27, 1934, Serial No. 741,638

22 Claims. (Cl. 90—13)

This invention relates to the formation of a continuous flat surface on a work piece by the so-called face milling process wherein a surface layer of metal is removed in the rotation of a cutter about an axis perpendicular to the surface to be formed.

One object of the invention is to provide a new and improved method of face milling by which metal may be removed at a greater rate than has been possible heretofore.

Another object is to provide a novel method of and apparatus by which a smoother and more accurate surface than has been possible heretofore may be formed on a work piece in a single milling operation.

The invention also resides in the novel construction of the milling cutter and the manner of actuating the same to carry out the improved method efficiently and reliably.

Other objects and advantages of the invention will become apparent from the following detailed description taken in connection with the accompanying drawings, in which Figure 1 is a schematic view showing the elements of a milling machine in which the improved method may be practiced.

Fig. 2 is a development view illustrating the axial spacing of the cutting edges in one form of cutter which may be used.

Fig. 3 is a fragmentary view illustrating the manner in which metal is removed by an ordinary face milling cutter which is shown in elevation.

Fig. 4 is a view similar to Fig. 3 illustrating the manner in which metal is removed in accordance with the present invention.

Fig. 5 is a diagrammatic view showing the relation of the cutting edges and the shape of the cuts taken in accordance with the present method.

Fig. 6 is a perspective underside view of the cutter shown in Fig. 4.

Fig. 7 is a perspective view on an exaggerated scale of a partially milled work piece.

Fig. 8 is a face view of a modified form of cutter.

In the formation of a continuous flat surface 10 on a work piece 11 by an ordinary face milling operation, the edges 12 of the cutter blades 13, which move successively across the work, remove layers 14 of metal which, as shown in Fig. 3, are disposed perpendicular to the surface 10 so that the width of the layer removed by each blade is fixed by the amount of metal to be removed from the casting. The maximum thickness of the chips and the speed of rotation of the cutter are limited by the character of the material of which the cutting edges are composed. It will be seen, therefore, that these three factors impose fixed limitations upon the rate at which a work piece may be face milled, that is, the rate of relative feed between the cutter and the work.

The present invention aims to overcome the foregoing limitations and increase appreciably the rate of metal removal by taking successive cuts along planes which are disposed parallel to the surface to be formed, and a final cut along the plane of such surface. Accordingly, as illustrated in Fig. 4, the invention contemplates subjecting progressive zones of the surface portion on the work piece 11 to the successive action of a series of elongated cutting edges 15 revolving in spaced parallel planes progressively approaching the surface to be formed while the work and the edges are being fed in the direction of said surface and in timed relation to the rotary motion of the edges. Thus, each time the series of the cutting edges moves across the work, successive thin layers or slices 16 of metal will be removed from an arcuate section 17 of the work piece. Since these layers extend parallel to the surface 10 and in the direction of relative feed between the cutter and the work piece, their width, which is measured in the direction of the feed, may be increased to several times that of the layers 14 (Fig. 2). A greater volume of metal may thus be removed by each cutting edge as it passes across the work thereby enabling the rate of feed to be increased without subjecting the material of which the cutting edges are composed to greater strain, that is, without increasing either the depth of the individual cuts or the speed at which each blade traverses the work.

To mount the cutting edges for movement of the above character, the edges are formed on the sides of elongated blades 18 extending in a generally radial direction and annularly spaced around the end face of a rotatable body 19 in which the blades are anchored in any suitable manner, preferably for adjustment in the direction of the cutter axis. The blades project progressively increasing distances from the body so that the edges 15 will be disposed in parallel planes spaced along and substantially perpendicular to the axis of rotation of the cutter. The length of the edges measured in a radial direction is determined by the maximum width of cut to be taken, all of the cutting edges being of substantially the same length so as to take cuts of equal width in moving across the face of the work. The overall diameter of the cutting face defined by the edges 15 is somewhat greater than the width of the work to be operated upon.

During the milling operation, the cutter is supported as shown in Figs. 1 and 4 with its axis perpendicular to the surface to be formed on the work piece and the body spaced above the work piece a distance such that the plane of the cutting edge 15ª of the longest blade 18ª coincides with the surface 10 to be formed. To support the parts in this relation and provide the rigidity necessary in view of the increased rate of metal removal, the cutter spindle 20 (Fig. 1) may, for example, be journaled in a quill 21 mounted for axial adjustment in a heavy fixed rail 22 supported at opposite ends by columns 23 upstanding from a bed 24. The work piece may be clamped firmly upon a table 25 which, in order to provide for relative feeding of the work and cutter, is slidable on ways 26 on the bed.

With the cutter thus mounted relative to the work, the milling operation is performed while the table 25 is being fed in timed relation to the rotation of the cutter. To permit of a continuous feed, the cutting edges 15 are spiralled in a circumferential direction so that the outer ends of successively acting edges from the leading to the final edge of the series, progressively approach the axis of rotation of the cutter. As shown in Fig. 5, the edge 15ᵇ of the shortest or leading blade 18ᵇ is radially offset outwardly from the edge 15ª of the longest or trailing blade 18ª a distance somewhat less than the radial length of the blade so that the inner and outer end portions of the terminal cutting edges 15ª and 15ᵇ overlap.

By virtue of the spiral arrangement of the blades, it will be apparent from Fig. 5 that in the rotation of the cutter in the direction indicated by the arrow combined with the feeding movement, the edges of the spiral-helical series will pass across the same arcuate section or zone 17 of the work, the leading edge 15ᵇ shaving the work surface to a depth 27 (see Fig. 7) while the succeeding teeth will cut to increasing depths 28, the trailing edge 15ª forming the finished surface 10. Owing, however, to the difference in the radial positions of the extreme outer ends of the blades, these ends will not traverse exactly the same paths but will form a slightly stepped edge surface as shown at 29 in Fig. 7.

The rate of feed is so coordinated with the rotation of the cutter that, during each passage of the blades across, the work will be advanced a distance somewhat less than the effective radial length of the cutting edges 15. In this way, the paths of movement of the trailing cutting edge 15ª in successive cuts will overlap each other by an amount greater than the width of the stepped surface 29 so that all of the metal will be removed in thin slices down to the plane of the finished surface 10 which will be continuous and smooth. Thus, as shown in Fig. 7, the leading or shortest blade 18ᵇ and the longest blade 18ª will be in engagement with the work at the same time but cutting along different paths, the former shaving the work piece to the depth 27 while the latter is producing the cut defining the surface 10.

While the rate of feed and cutter rotation may be synchronized in various ways with sufficient accuracy, both motions are produced in the present instance by an electric motor 30 which is connected through suitable gearing to the cutter spindle 20. The motor shaft is also geared to one terminal member of a differential gearing 31 having an intermediate member 32 operating through appropriate reduction gearing to drive a rotary feed element 33 cooperating with an element 34 on the work table to impart rectilinear motion thereto. Return of the table to starting position at rapid traverse speed is produced by operation of an electric motor 35 arranged to drive the other terminal member of the gearing 31. As shown in the drawings, the slices of metal removed successively from the work as the series of cutting edges passes across the work are extremely thin in a direction perpendicular to the final work surface as compared to their width in the direction of the feeding movement, the width of the slices being many times as great as their thickness.

From the foregoing, it will be apparent that the volume of metal removed in the passage of each cutting edge in an orbital path across the work piece may be varied as desired by changing the lengths of the cutting edges 15 and the rate of feed, and this without imposing any additional burden on the material of which the edges are composed. It has been found that the cuts taken by the edges 15 may be increased to a width sufficient to permit of a feed rate several times as great as that which has been considered a safe maximum in standard face milling practice. However, owing to various factors, including the necessity for increasing the rigidity of the cutter mounting in proportion to the increased rate of metal removal, there are, of course, practical limits beyond which the width of the cuts and therefore the rate of feed cannot be increased.

The present method not only permits a work piece to be milled at greater speed, but also enables a smooth surface to be formed in a single operation with greater precision than is ordinarily obtained by taking separate roughing and finishing cuts as is usually done in present face milling practice. This improved result is due to the fact that all parts of the work surface are finished by a single cutting element which moves in the plane of the work surface. Thus, the elongated trailing edge 15ª operates with a shaving action producing a smooth finish over each arcuate section of the work piece, and since this edge alone produces the final cut at all points, uniformity of depth over the entire work piece may be attained simply by accurate location of this one cutting edge.

The relative depths of the cuts taken by the different blades 18 may be varied as desired. For example, as illustrated in Fig. 2, the cutting edges may be disposed in parallel planes which are spaced progressively increasing distances apart from the leading to the trailing blades. Thus, a layer of maximum thickness would be removed by the leading blade 18ᵇ while the trailing or finishing blade 18ª would take a light cut resulting in the formation of a smooth finished surface.

In order to break up the rhythmic action of the cutter blades and thereby reduce the tendency of the blades to chatter under the stresses to which they are subjected, the cutting edges 15 are preferably arranged on the body 19 so as to be unevenly spaced. As shown in Fig. 8, this may be accomplished by locating certain of the blades so that the edges 15 will be inclined at various angles relative to radii through these edges.

Under certain conditions, it may be desirable to provide more than one set of stepped blades on the cutter so that two or more arcuate sections of the work will be milled in each revolution of the cutter. Where two sets are used, the blades would be arranged on the cutter body as shown in Fig. 8, the shortest blade 18$^b$ of one being disposed adjacent the longest or trailing blade 18$^a$ of the other set. The rate of feed may, of course, be increased in proportion to the number of spiral groups of edges that are employed, the maximum rate in any instance being equal to the number of spiral groups of cutting edges multiplied by the maximum effective length of the shortest available edge.

We claim as our invention:

1. The method of removing metal from a work piece to form a plane surface comprising bodily moving the work piece and a cutting tool at a continuous rate relative to each other longitudinally of the surface to be formed, and in the course of such movement taking a succession of arcuate cuts across the work piece of substantially uniform width and in substantially parallel planes progressively approaching and finally terminating in the plane of said surface whereby to remove the metal in a multiplicity of thin layers having substantially greater width in the direction of said movement than thickness in a perpendicular direction, and successively taking similar successions of cuts across progressively advancing overlapping zones of the work to form a continuous plane surface defined by the cutting edges last engaging said overlapping zones.

2. The method of removing metal from a work piece to form a plane surface comprising bodily moving the work piece and a cutting tool at a continuous rate relative to each other longitudinally of the surface to be formed, and in the course of such movement taking a succession of arcuate cuts of substantially uniform width across the work piece transversely of the direction of said bodily movement to form successive surfaces progressively approaching and finally terminating in the plane of said surface whereby to remove the metal in a multiplicity of thin layers having substantially greater width in the direction of said movement than thickness in a perpendicular direction, and successively taking similar successions of cuts along progressively advancing zones of the work to form a continuous plane surface.

3. The method of face milling a metallic work piece which comprises revolving a plurality of sets of radial cutting edges about a common axis with the outer ends of the edges of each set arranged in spiral formation and the successive spaced edges of each spiral set disposed in substantially parallel axially separated planes spaced apart distances equal to a small fraction of the effective radial length of the individual edges, supporting a work piece with the plane of the innermost one of said edges coinciding with the final work surface to be produced, and moving the work piece and the revolving edges bodily relative to each other and longitudinally of said planes at such rate as to advance the spiral sets of edges successively across progressive arcuate zones of the work and cause removal from each zone of successive metal layers each having a width in the direction of the feed several times as great as the thickness in a perpendicular direction.

4. The method of face milling a metallic work piece to form a continuous flat surface thereon which comprises revolving one or more sets of radial cutting edges about a common axis with the outer ends of the edges of each set arranged in spiral formation and the successive spaced edges disposed in parallel axially separated planes spaced apart distances substantially less than the individual radial length of the edges, supporting a work piece with the plane of the innermost one of said edges coinciding with the final work surface to be produced, and relatively moving the work piece and said edges longitudinally of said planes at a continuous rate a distance per revolution of said cutter less than the radial length of the individual edges multiplied by the number of said sets whereby to subject overlapping arcuate zones of the work to the action of the respective sets of edges and cause removal of metal in successive layers each having a width in the direction of feed several times the thickness in a perpendicular direction.

5. The method of removing metal from a work piece to form a plane surface, which comprises relatively feeding the work and a revolving series of cutting edges, and during such feed removing all of the metal in the path of said series of edges down to the final plane of the last edge to cut, by successively cutting off thin slices of the metal progressively from the initial face toward said final surface and in zones progressing along the work in a direction parallel to said final surface.

6. The method of removing metal from a work piece to form a plane surface, which comprises causing a continuous feeding movement between the work and a revolving series of cutting edges along the plane of the final finished surface, and during such movement taking arcuate cuts successively from the outer face toward the final surface to remove thin slices of metal which are wide in the direction of the feed and thin in a perpendicular direction.

7. The method of removing metal to form a plane surface, which comprises relatively feeding the work and a series of cutting edges and during such feeding, revolving said edges about an axis perpendicular to said surface to remove all metal in the path of said edges down to the final plane of the last cutting edge, by cutting off from progressively advancing and overlapping zones of the work metal slices of substantially uniform width in the direction of feed progressing from the rough surface to the final work surface and disposed parallel thereto.

8. The method of removing metal from a work piece to form a plane surface, which comprises revolving a series of cutting edges disposed in progressive spaced planes along the axis of revolution of said cutting edges and also in a spiral with the outer ends of the initial cutting edges nearer the periphery of the series than the corresponding ends of succeeding cutting edges and diminishing in stages in the distances between said spaced planes from the periphery toward the axis of the series, and causing relative feeding movement between the work and said series at a rapid rate such as to effect removal, along progressively advancing zones, of successive thin layers of metal having their major dimension in the direction of such feeding movement.

9. The method of removing metal from a work piece to form a plane surface, which comprises subjecting the work piece to the action of a series of cutting edges moving in orbits in different planes parallel to and progressively approaching the plane of the finished surface with the outer ends of the initial cutting edges nearer the periphery of the series than the corresponding ends of succeeding cutting edges, and causing relative feeding movement between the work piece and the series of edges in a plane parallel to said finished surface and at a rate of feed to remove chips of greater dimension in the direction of such feed than perpendicular thereto and to cause the final cutting edges to leave a plane machined surface.

10. The method of face milling a metallic work piece which comprises revolving about a common axis a plurality of sets of radial cutting edges each having its edges of equal effective radial lengths arranged in spiral formation and the successive inwardly spaced edges disposed in substantially parallel planes perpendicular to said axis and spaced apart distances equal to a small fraction of the effective radial length of the individual edges, supporting a work piece with the plane of the innermost edge of each set coinciding with the work surface to be produced, and moving the work piece and the revolving edges bodily relative to each other and longitudinally of said planes at a rate to advance the spiral sets of edges successively across overlapping arcuate zones of the work and cause removal from each zone of successive metal layers each having a width in the direction of the feed several times as great as the thickness in a perpendicular direction.

11. A method of removing metal from a work piece to form a plane surface thereon comprising the steps of causing continuous relative feeding movement between the work and a series of cutting edges rotating about an axis perpendicular to the desired final surface of the work and disposed in spaced planes along such axis, and during such feeding movement causing said spaced edges to effect removal of all metal in the feeding path of said series of edges by cutting successive slices of metal each of which is thin in a direction perpendicular to said final surface as compared with the total thickness of metal removed by the whole series of edges.

12. For removing metal from a work piece to form a plane surface thereon, a face milling machine comprising, in combination, a power rotated cutter having a series of cutting edges arranged in a plurality of sets each set comprising a plurality of such edges angularly spaced around the axis of one end face of the cutter in spiral formation, with the successive spaced edges of each spiral set disposed in planes substantially perpendicular to and progressively spaced along the axis of rotation of said cutter, the spacing of the adjacent planes being substantially less than the effective radial lengths of said edges, means supporting said work piece and said cutter for relative feeding movement longitudinally of said planes with the plane of the innermost cutting edge of each of said sets coinciding with the final plane of the work surface to be formed, and power operated mechanism for effecting said feeding movement at a continuous rate to advance the spiral sets of said edges successively across overlapping arcuate zones of said work piece and cause each set of edges to remove from one zone successive layers of metal having widths in the direction of the feed several times as great as the thickness perpendicular to the plane of the feed.

13. For removing metal from a work piece to form a plane surface thereon, a face milling machine comprising, in combination, a power rotated cutter having a series of cutting edges arranged in a plurality of sets, each set comprising a plurality of such edges of substantially equal radial lengths angularly spaced around the axis of rotation of the cutter in spiral formation approaching said axis, with the successive spaced edges of each spiral set disposed in successive substantially parallel planes progressively spaced along said axis, and the plane of the final edges of each of said sets disposed perpendicular to said axis, the effective radial lengths of the individual edges being several times greater than the spacing of the adjacent planes thereof, means supporting said work piece and said cutter for relative feeding movement longitudinally of said planes and with the plane of the final cutting edge of each of said sets coinciding with the plane of the work surface to be formed, and power operated mechanism for relatively and continuously feeding the work piece and said cutter during each revolution of the cutter through a distance less than the maximum effective radial length of the shortest available edge multiplied by the number of said sets of edges but sufficient to effect removal of successive metal layers several times as wide in the direction of the feed as thick in a plane perpendicular to the feed.

14. For removing metal from a work piece to form a plane surface thereon, a face milling machine comprising, in combination, a power rotated cutter having a series of cutting edges arranged in one or more sets, each set comprising a plurality of such edges of substantially equal effective radial lengths angularly spaced around the axis of rotation of the cutter in spiral formation approaching said axis, with the successive inwardly spaced edges of each spiral set disposed in substantially parallel planes progressively spaced along said axis, the adjacent planes of the preceding edges being spaced shorter distances apart than the adjacent planes of the following edges, the effective radial lengths of the individual edges being several times greater than the spacing of the adjacent planes thereof, means supporting said work piece and said cutter for relative feeding movement longitudinally of said planes and with the plane of the innermost cutting edge of each of said sets coinciding with the plane of the final work surface to be formed and with said axis disposed substantially perpendicular to the plane of the feeding movement, and power operated mechanism for relatively and continuously feeding the work piece and said cutter during each revolution of the cutter through a distance less than the effective radial length of said edges multiplied by the number of said sets of edges but sufficient to effect removal of successive metal layers several times as wide in the direction of the feed as thick in a perpendicular direction.

15. For removing metal from a work piece to form a plane surface thereon, a face milling machine comprising, in combination, a power driven cutter rotatable about an axis perpendicular to the plane of said surface and having thereon a succession of substantially radially extending cutting edges of approximately equal effective radial lengths angularly spaced around said axis in a spiral formation approaching said axis and disposed in substantially parallel planes progressively spaced toward and finally coinciding with the plane of the work surface to be formed, the effective radial lengths of each of said edges being many times the spacing of the adjacent planes, and means for relatively feeding said work piece and the rotating cutter longitudinally of said planes at a continuous rate to effect removal of metal from arcuate zones of the work in thin slices having widths in the direction of the feed several times the thickness in a plane perpendicular to the feed.

16. A machine for removing metal from a work piece to form a plane surface thereon comprising in combination, a cutter head having a series of cutting edges projecting from one end thereof, each of said edges being disposed in a plane approximately parallel to the plane of the desired final surface, the successive edges being positioned progressively along the axis of rotation of the cutter and also in spiral formation, with the outer end of the initial cutting edge farthest from said axis, means for rotating said cutter, and means for causing relative feeding movement between said cutter and a piece of work in a direction parallel to the final surface to effect removal from the work of thin slices of metal successively from the outer face thereof toward said final surface and in progressive zones along the work to remove all of the metal in the path of the cutter down to said final surface.

17. A machine for removing metal from a work piece to form a plane surface thereon comprising in combination, a cutter head having a series of radially extending cutting edges projecting from one end thereof, each of said edges being disposed in a plane approximately parallel to the plane of the desired final surface, the successive edges being positioned progressively along the axis of rotation of the cutter and also in spiral formation, with the outer end of the initial cutting edge farthest from said axis, means for rotating said cutter, and means for causing relative feeding movement between said cutter and a piece of work in a direction parallel to the final surface to effect removal from progressive zones of the work of successive slices of metal parallel to said final surface and many times as wide in the direction of the feed as thick in a direction perpendicular to the final surface.

18. A face milling cutter for removing metal to form a plane surface by relative feeding movement between a work piece and the cutter parallel to said surface, said cutter comprising, in combination, a body adapted for rotation about an axis, a plurality of sets of substantially radially extending and angularly spaced blades, and cutting edges on said blades arranged in a plurality of sets, each set comprising a plurality of such edges angularly spaced around said axis in spiral formation with the outer ends of the successive spaced edges of each spiral set progressively nearer said axis and respectively disposed in substantially parallel planes progressively spaced along said axis, the individual lengths of said edges being several times the spacing of the adjacent planes and the spacing of the planes between the adjacent preceding edges being greater than the spacing between the planes of the following edges.

19. A face milling cutter for removing metal to form a plane surface by relative feeding movement between a work piece and the cutter parallel to said surface, said cutter comprising, in combination, a body adapted for rotation about an axis, a plurality of sets of radially extending and angularly spaced blades, and cutting edges on said blades arranged in a plurality of sets each comprising a plurality of such edges having substantially equal radial lengths and angularly spaced around said axis in spiral formation approaching said axis with the successive spaced edges of each spiral set disposed respectively in planes substantially perpendicular to said axis and progressively spaced along said axis, the individual lengths of said edges being several times the spacing of the adjacent planes.

20. A face milling cutter for removing metal to form a plane surface by relative feeding movement between a work piece and the cutter parallel to said surface, said cutter comprising, in combination, a body rotatable about an axis, a plurality of radially extending blades angularly spaced around said axis and projecting from said body progressively increasing distances in the direction of said axis to define elongated cutting edges of substantially equal effective lengths disposed in axially spaced planes perpendicular to said axis, the edges on the successively farther projecting blades being spaced progressively toward said axis in spiral formation.

21. A cutter adapted to machine a plane surface on a work piece when the cutter is rotated about its axis and is relatively fed in a direction parallel to said plane surface, said cutter comprising a body having a series of cutting edges of approximately equal length disposed generally in spiral helical formation in planes approximately perpendicular to said axis, with the succeeding cutting edges approaching said axis, the spacing of said edges along said axis diminishing in stages between the initial and the final edges.

22. A face milling cutter for removing metal to form a plane surface by relative feeding movement between a work piece and the cutter parallel to said surface, said cutter comprising, in combination, a body rotatable about an axis, a plurality of radially extending blades angularly spaced around said axis and projecting from said body progressively increasing distances in an axial direction to define elongated cutting edges of substantially equal effective lengths disposed in axially spaced planes perpendicular to said axis, the respective edges being disposed progressively about said axis in spiral formation approaching said axis with the inner and outer ends of the terminal edges overlapping each other radially.

RAYMOND S. PERRY.
ALEXANDER OBERHOFFKEN.